US008259947B2

(12) United States Patent  (10) Patent No.: US 8,259,947 B2
Rose et al.  (45) Date of Patent: Sep. 4, 2012

(54) RECREATING A CRYPTOGRAPHIC KEY IN A REPLACEMENT DEVICE

(75) Inventors: Gregory Gordon Rose, Concord (AU); Alexander Gantman, Poway, CA (US); John W. Noerenberg, II, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 879 days.

(21) Appl. No.: 10/752,420

(22) Filed: Jan. 5, 2004

(65) Prior Publication Data

US 2004/0218763 A1 Nov. 4, 2004

Related U.S. Application Data

(60) Provisional application No. 60/438,617, filed on Jan. 7, 2003.

(51) Int. Cl.
*H04L 9/00* (2006.01)
(52) U.S. Cl. ........................................................ 380/277
(58) Field of Classification Search ................... 380/277
See application file for complete search history.

(56) References Cited

U.S. PATENT DOCUMENTS

| 5,201,000 | A |   | 4/1993  | Matyas et al.   | 380/30  |
|-----------|---|---|---------|-----------------|---------|
| 5,675,649 | A | * | 10/1997 | Brennan et al.  | 380/286 |
| 5,761,306 | A | * | 6/1998  | Lewis           | 380/282 |
| 5,903,882 | A | * | 5/1999  | Asay et al.     | 705/44  |
| 6,009,177 | A | * | 12/1999 | Sudia           | 713/191 |
| 6,263,437 | B1| * | 7/2001  | Liao et al.     | 713/169 |
| 6,321,095 | B1| * | 11/2001 | Gavette         | 455/517 |
| 6,782,103 | B1| * | 8/2004  | Arthan et al.   | 380/278 |
| 6,959,393 | B2| * | 10/2005 | Hollis et al.   | 726/21  |
| 7,162,037 | B1| * | 1/2007  | Schwenk         | 380/286 |
| 2002/0018570 | A1| * | 2/2002 | Hansmann et al. | 380/270 |
| 2002/0071561 | A1| * | 6/2002 | Kurn et al.     | 380/277 |
| 2002/0152380 | A1| * | 10/2002 | O'Shea et al.  | 713/170 |

(Continued)

FOREIGN PATENT DOCUMENTS

EP 1249964 10/2002

(Continued)

OTHER PUBLICATIONS

Bruce Schneier, Applied Cryptography, 1996, John Wiley & Sons, Inc., Second Edition, pp. 181-182.*

(Continued)

*Primary Examiner* — Cordelia Zecher
(74) *Attorney, Agent, or Firm* — Jae-Hee Choi; Won Tae Kim (57) ABSTRACT

Embodiments describe a method and/or system whereby a secret key in a cryptographic system may be replaced without revealing the secret key. One embodiment comprises creating a first private key and corresponding first public key. A second private key associated with the first private key and a second public key corresponding to the second private key are also created. The second private key is output once such that it can be re-created and the second public key is output when outputting the first public key. The first private key is used for authentication. The method further comprises re-creating the second private key; and using the second private key for authentication. Another embodiment comprises creating a private key and corresponding public key with associated system parameter; outputting the system parameter when outputting the public key; and using the private key for authentication. The method may further comprise creating a new private key using the previous key and the system parameter.

44 Claims, 5 Drawing Sheets

U.S. PATENT DOCUMENTS

2003/0081785 A1* 5/2003 Boneh et al. .................. 380/277

FOREIGN PATENT DOCUMENTS

| JP | 5224604 | 9/1993 |
|---|---|---|
| JP | 2000174746 | 6/2000 |
| JP | 2000307588 | 11/2000 |
| JP | 2001103045 | 4/2001 |
| JP | 2001507528 | 6/2001 |
| JP | 2002374240 | 12/2002 |
| WO | WO9718655 A1 | 5/1997 |
| WO | 0108347 | 2/2001 |
| WO | 0205475 | 1/2002 |

OTHER PUBLICATIONS

International Search Report, PCT/US03/41538, International Search Authority, May 3, 2004.
International Preliminary Examination Report, PCT/US03/41538, International Search Authority, May 23, 2005.
Supplementary European Search Report—EP03800318, Search Authority—Munich—Apr. 28, 2006.
Written Opinion—PCT/US03/041538, IPEA/US—Jan. 4, 2005.
European Search Report—EP09011048—Search Authority—Munich—Mar. 25, 2010.

* cited by examiner

RECREATING A CRYPTOGRAPHIC KEY IN A REPLACEMENT DEVICE

CROSS-REFERENCE TO RELATED APPLICATION

This application claims the benefit of U.S. Provisional Patent Application Serial No. 60/438,617, filed Jan. 7, 2003, which is incorporated herein by reference in their entirety.

BACKGROUND

I. Field of Invention

The invention generally relates to cryptosystems and more particularly to generation and replacement of keys for cryptosystems.

II. Description of the Related Art

Cryptographic signatures may be generated using public-key cryptography. In public-key cryptography systems, a user has both a private key and a public key for authenticating documents. The public key is shared while the private key is kept secret. The user signs a communication with the user's private key by sending the communication along with a digital signature to a targeted entity or party, who then verifies the communication and the digital signature with the user's public key.

In one application, a public-key cryptography system may be implemented in a portable device (hereinafter token). The private and public keys are generated for the token. The private key remains in the token and the public key is sent to one or more targeted entities. The token can then be used by the owner to establish various relationships with targeted entities to enable access to doors, bank accounts, computer networks, and so on.

However, the token (and hence the private key stored in it) might be stolen, or alternatively broken, lost or destroyed. If the token is stolen, it is important to limit the damage done by the thief while the token is in their possession. If, for whatever reason, its owner just can't use it any more, the problem is more one of major inconvenience for the owner while re-establishing the various relationships enabled by the token.

Therefore, there is a need for a more convenient, efficient and/or confidential method of replacing cryptographic keys in tokens.

SUMMARY

Embodiments describe a method and/or system whereby a secret key may be replaced without revealing the secret key. More particularly, the owner of a token, for example, can make provision for its future replacement, without revealing the secret key at the time. For example, when a replacement token is used, it may be implicitly verified and the act of using the new token will be used by the verifier to disable the old token. This is important for at least two reasons. First, if the original token was stolen, the thief will no longer be able to use the stolen token with that verifier. Second, if the provision for future use is somehow abused and a new token is created without the knowledge of the token's owner, the owner will soon become aware of this when authentication using the existing token is refused. Therefore, the owner can take other corrective action.

In one embodiment, a method for authentication in a public cryptographic system comprises creating a first private key and corresponding first public key. A second private key associated with the first private key and a second public key corresponding to the second private key are also created. The second private key is output once such that it can be re-created and the second public key is output when outputting the first public key. The first private key is used for authentication. The method further comprises re-creating the second private key; and using the second private key for authentication.

The first private key may be disabled when the second private key is used for authentication. In addition, a third private key associated with the second private key and a third public key corresponding to the third private key may be created. The third private key may be output once such that it can be re-created. The third private key may then be re-created and used for authentication. Alternatively, the use of the second private key for authentication may be disabled and the third private key may be used for authentication. The third private key may then be re-created and used for authentication.

The method may further comprise creating a third private key associated with the second key and creating a third public key corresponding to the third private key; creating a fourth private key associated with the third private key and creating a fourth public key corresponding to the fourth private key; outputting the fourth private key once such that it can be re-created; and outputting the third and fourth public keys. The use of the second private key for authentication may be disabled and the third private key used for authentication. The fourth private key may then be re-created and used for authentication. Furthermore, outputting the second private key may comprise creating at least two shares of the second private key and outputting each share once to a different entity.

In another embodiment, a method for cryptographic verification comprises receiving a first public key; receiving a second public key associated with the first public key; using the first public key for authentication; and using the second public key for authentication if the first public key fails. The method further comprises receiving a third public key associated with the second public key, if the first public key fails and if the second public key results in a successful authentication. Alternatively, the method comprises receiving a third public key and a fourth public key associated with the second public key, if the first public key fails and if the second public key results in a successful authentication.

In still another embodiment, a method for authentication comprises creating a private key and corresponding public key with associated system parameter; outputting the system parameter when outputting the public key; and using the private key for authentication. The method may further comprise creating a new private key using the previous private key and the system parameter. A counter value indicating the generation of public and private keys may be created and output when outputting the public key. A new private key may then be created using the previous private key and the system parameter based on the counter value.

Moreover, in another embodiment, a method for verification comprises receiving a public key; receiving a system parameter associated with the public key; authenticating using the public key; and generating a new public key and authenticating using the new public key wherein the new public key is derived from the previous public key and the system parameter. The method may further comprise using a number of powers of the previous public key for authentication; and accepting one that works as the new public key. Alternatively, the method may further comprise receiving a counter value indicating the generation of private and public keys; and generating the new public key using the previous public key and the system parameter based on the counter value.

In yet another embodiment, an apparatus for authentication in a public cryptographic system may comprise means for creating a first private key and corresponding first public key; means for creating a second private key associated with the first private key and creating a second public key corresponding to the second private key; means for outputting the second private key once such that it can be re-created; means for outputting the second public key when outputting the first public key; and means for using the first private key for authentication. Alternatively, an apparatus for authentication in a public cryptographic system may comprise means for creating a private key and corresponding public key with associated system parameter; means for outputting the system parameter when outputting the public key; and means for using the private key for authentication.

In a further embodiment, an apparatus for verification in a public cryptographic system may comprise means for receiving a first public key; means for receiving a second public key associated with the first public key; means for using the first public key for authentication; and means for using the second public key for authentication if the first public key fails. Alternatively, an apparatus for verification in a public cryptographic system may comprise means for receiving a public key; means for receiving a system parameter associated with the public key; means for authenticating using the public key; and means for generating a new public key and authenticating using the new public key, if a previous public key fails, the new public key being derived from the previous public key and the system parameter.

In still a further embodiment, a machine readable medium in a public cryptographic system may comprise a set of code segments for creating a first private key and corresponding first public key; a set of code segments for creating a second private key associated with the first private key and creating a second public key corresponding to the second private key; a set of code segments for outputting the second private key once such that it can be re-created; a set of code segments for outputting the second public key when outputting the first public key; and a set of code segments for using the first private key for authentication. A machine readable medium in a public cryptographic system may comprise a set of code segments for creating a private key and corresponding public key with associated system parameter; a set of code segments for outputting the system parameter when outputting the public key; and a set of code segments for using the private key for authentication.

In yet a further embodiment, a machine readable medium in a public cryptographic system may comprise a set of code segments for receiving a first public key; a set of code segments for receiving a second public key associated with the first public key; a set of code segments for using the first public key for authentication;

and a set of code segments for using the second public key for authentication if the first public key fails. A machine readable medium in a public cryptographic system may comprise a set of code segments for receiving a public key; a set of code segments for receiving a system parameter associated with the public key; a set of code segments for authenticating using the public key; a set of code segments for generating a new public key and authenticating using the new public key, if a previous public key fails, the new public key being derived from the previous public key and the system parameter.

BRIEF DESCRIPTION OF THE DRAWINGS

Various embodiments will be described in detail with reference to the following drawings in which like reference numerals refer to like elements, wherein.

DETAILED DESCRIPTION

Generally, embodiments described allow provisions for future replacement of a secret key without revealing the secret key. In the following description, specific details are given to provide a thorough understanding of the invention. However, it will be understood by one of ordinary skill in the art that the invention may be practiced without these specific details. For example, circuits may be shown in block diagrams in order not to obscure the invention in unnecessary detail. In other instances, well-known circuits, structures and techniques may be shown in detail in order not to obscure the invention.

It is noted that the invention may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to a calling function or a main function.

Figure 1:
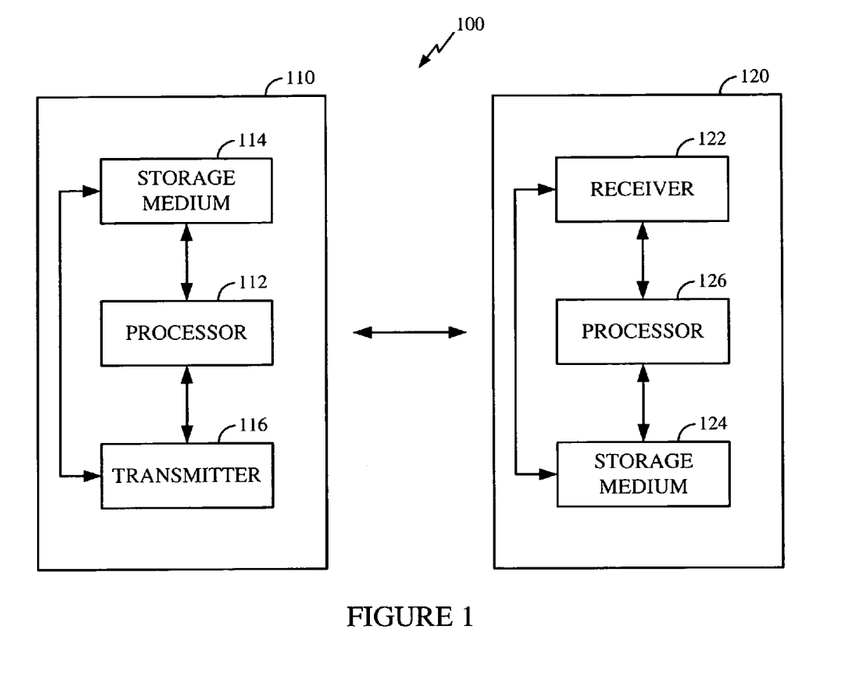
FIG. 1 shows one embodiment of a cryptographic system.

FIG. 1 shows one embodiment of a cryptographic system 100 comprising a user device 110 and a verifier device 120. User device 110 may be implemented in a token, a portable phone, a personal data assistant, a personal computer (desktop or laptop) or other electronic devices. Verifier device 120 may be implemented by entities such as banks, attorneys or a trusted third party such as the company, Verisign. Although FIG. 1 shows one verifier device 120, it will be understood by those skilled in the art that there may be one or more verifier devices.

User device 110 comprises a processor 112 to generate and manipulate cryptographic keys, a storage medium 114 to store the generated cryptographic keys and a transmitter 116 to transmit communications. In public key cryptography systems, the private key is the secret key that remains in user device 110 while the public key is transmitted to verifier device 120 using transmitter 116. A communication is then signed with the private key and sent to verifier device 120 for authentication.

Verifier device 120 comprises a receiver 122 to receive communications from user device 110, a storage medium 124 to store the received communications and a processor 126 to authenticate a communication. Storage medium 124 may also implement an authentication database to store the public keys transmitted from user device 110. More particularly, receiver 122 receives the public key and creates the authentication database stored in storage medium 124. When verifier device 120 receives a signed communication for authentication, the corresponding public key is obtained from the authentication database and used to verify the communication. It is to be noted that the authentication database may be implemented in a location different and/or externally from either storage medium 124 and/or verifier device 120.

Figure 2:
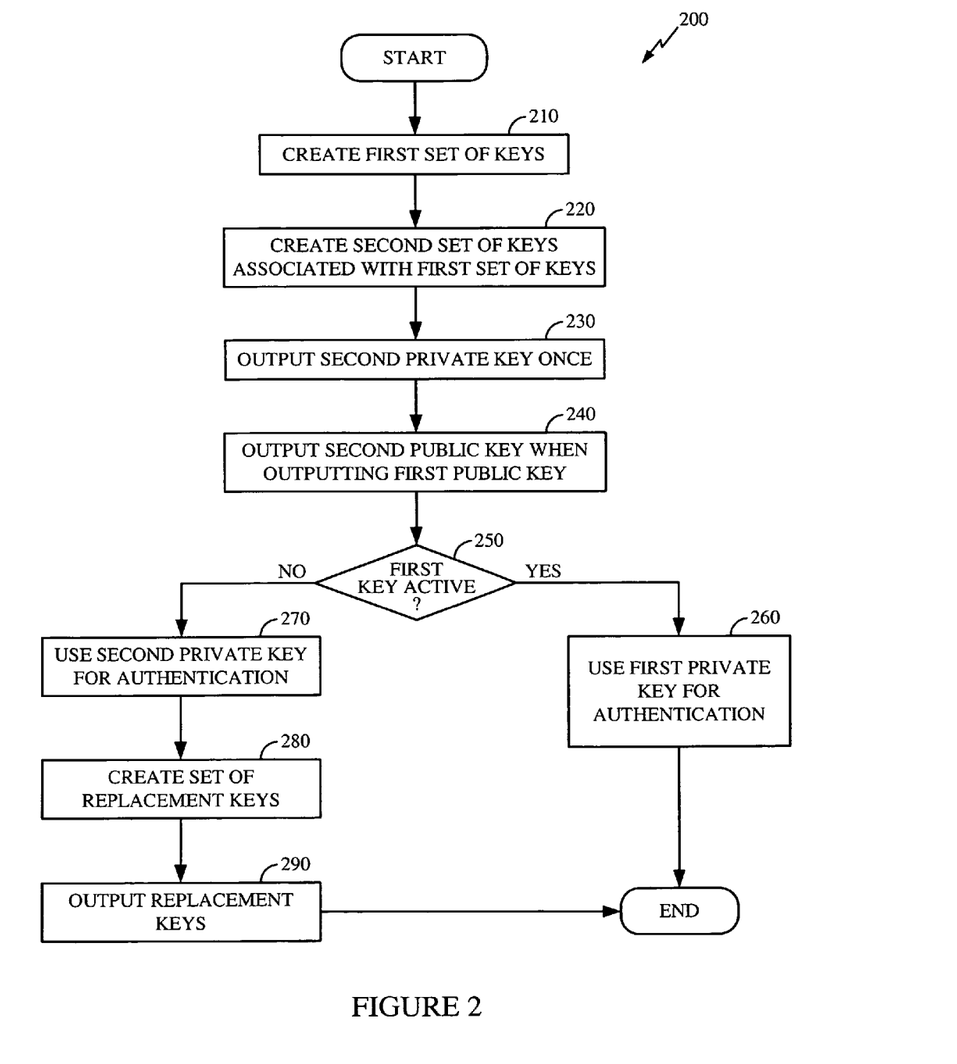
FIG. 2 shows a method for authentication from a user device.

FIG. 2 shows a method 200 for generating keys for public key cryptographic systems. Processor 112 creates (210) a first set of keys, i.e. a first private key and corresponding first public key. Processor 112 also creates (220) a second set of keys, i.e. a second private key and corresponding second public key. The second set of keys is associated with the first set of keys. However, the second set is created independently from the first set. The keys may be generated using various algorithms known in the art.

For example, the keys may be generated based on the well known Digital Signature Standard (DSS). Here, processor 112 uses an internal source of randomness to create a private or secret key x to be used for DSS. A corresponding public key X is then calculated as follows, where P is a large prime number, for example 1024 bit, that defines a mathematical field in which the mathematical operations take place, Q is another prime number, typically of 160 bits or more, such that Q|(P−1), and g is an element of the field and is a generator of the order-Q subgroup of F*(P).

$$X = g^x \pmod{P}$$

The keys may initially be stored in storage medium 114. The first private key is kept within user device 110 and the second private key is output such that it can be re-created even if user device 110 is stolen, lost or broken. Here, the second private key may be kept within user device 110 and the first key output such that it can be re-created. However, for purposes of explanation, it will be assumed that the second private key is output. The key kept within user device 110 is the primary key used for authentication and becomes active. The private key output is the future replacement key and becomes inactive.

The second private key is output (230) once at the request of the owner of user device 110. Thereafter, user device 110 does not respond to such requests. The second public key is also output (240) when the first public key is output. Here, the second private and public keys may be output using transmitter 116.

In one embodiment, a secret sharing scheme may be used, whereby n shares of secret information are created within user device 110 and given out independently to trustworthy shareholder such that at a later time, k number of shareholders (k<n) can re-create the secret information. A trustworthy shareholder may be, but is not limited to, the owner of user device 110; a trusted friend of the owner; those who already have secret information of the owner such as banks, accountants, or other financial institutions; or "trusted third parties" such as Verisign.

For example, processor 114 of user device 110 may create three shares of the private key. These would be output, one at a time, at the request of the user using transmitter 116. Each share is output once to a designated one of three parties. After all shares have been output, user device 110 will no longer respond to such requests. However, the user can re-create the secret key with the cooperation of any two of the three parties, while none of the three parties can re-create the private key alone, should one turn out to be untrustworthy. Moreover, if one of the parties loses their share, the other two can still provide the information needed to create a replacement. If a secret sharing scheme is implemented, the first private key remains in user device 110 and the second private key is output as shares so that the second private key can be re-created. It is to be understood that more or less than three shares of the private key can be created and output to corresponding number of parties.

Referring back to FIG. 2, the first private key is used when authenticating, if it is active (250 and 260). Namely, user device 110 signs a communication with the first private key and sends the communication with associated signature to a targeted party, who then verifies the communication with the first public key. If the first private key is not active, the replacement private key, i.e. the second private key, is used (270) for authentication.

The first private key may not be active for various reasons. For example, owner of user device 110 may have replaced the first private key because user device 110 and/or the first private key is stolen, broken, lost and/or destroyed. More particularly, owner of user device 110 may inactivate and/or disable the first private key. In such case, the second private key is re-created and used for authentication. Alternatively, a private key may expire in some cryptography systems. If the first private key expires, the second private key is re-created by user device 110 and used for authentication. In some embodiments, user device 110 may be configured such that the use of the replacement private key disables the existing primary private key, which in this case is the first private key. Here, re-creating a private key may mean replacing user device 110, such as from an old token to a new token, if it is stolen, broken, lost and/or destroyed. Otherwise, re-creating a private key may mean changing the private key within user device 110, if only the secret key is stolen, lost and/or expires.

When the second private key is re-created and used for authentication, the second private key replaces the first private key and becomes active. Therefore, processor 112 creates (280) and outputs (290) a new set of replacement keys associated with the second private key. Namely, a third set of keys is created and output as future replacement keys. As with the first and second set of keys, while the third set of keys are associated with the second set of keys, the third set is created independently from the second set. Also, the second private key is kept within user device 110 while the third private key is output such that it can be re-created. Here, the third private key may be output once to one or more of the same or different entities using, for example, Shamir's sharing scheme which is well known in the art. The third public key may be output, using for example transmitter 116, when the second public key is output.

If the second private key becomes inactive, the third private key can be re-created to replace the second private key and used for authentication. In such case, another new set of replacement keys, for example a fourth set of keys, would be created and output as future replacement keys. More particularly, when a replacement private key is re-created and becomes a new primary key to replace a previous primary private key, a set of replacement keys is created and output as future replacement keys. If the third private key becomes inactive, the fourth private key can be re-created and used for authentication while a fifth set of keys would be created and output as future replacement keys. This creation, output and re-creation of secret keys may occur repetitively as described and as needed to replace previous secret keys. In some embodiments, the number of times a secret key can be replaced may be limited. Also, processor 114 may re-create replacement private keys and use the re-created keys for authentication. By creating, in advance, a set of replacement keys for each new primary private key, a private key may be replaced without being revealed.

Figure 3:
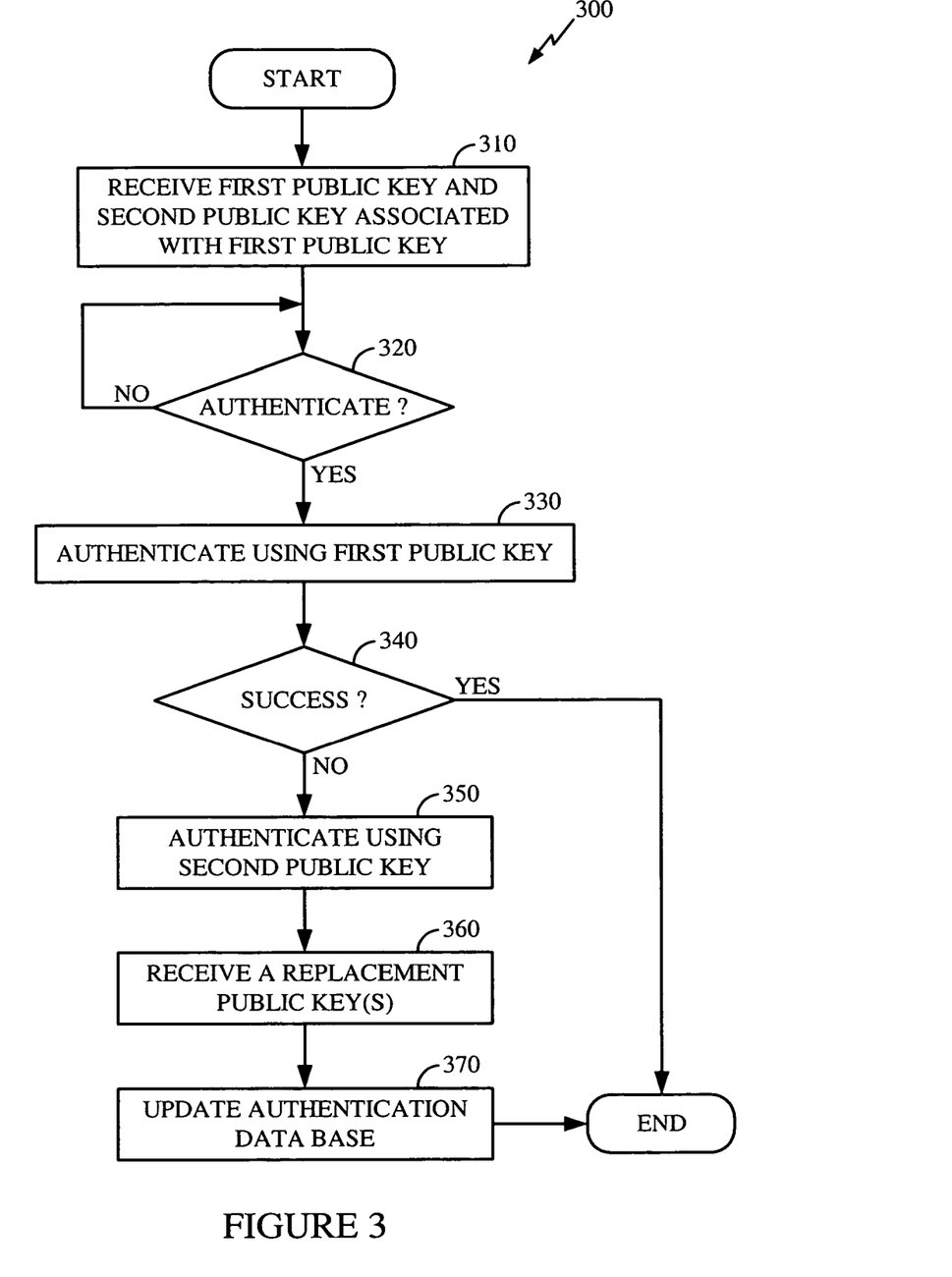
FIG. 3 shows a method for verification from a verifier device.

FIG. 3 shows a method 300 corresponding to the method 200 for authenticating communications. Verifier device 120 receives (310) a first public key and a second public key from user device 110, where the first public key corresponds to a first private key and the second public key corresponds to a second private key. The second private key is associated with the first private key and therefore, the second public key is associated with the first public key. The public keys are stored in the authentication database of storage medium 124. Here, one public key is stored as the primary public key that is active while the other public key is stored as the replacement public key that is inactive. In the example, the first public key is the primary key and the second public key is the replacement key. Also, the first public key and the second public key may be received using receiver 122.

When a signed communication is received from user device 110 for authentication, processor 126 attempts authentication (320 and 330) with the primary public key, i.e. the first public key in the example. Namely, the first public key is retrieved from the authentication database and used to verify the communication. If the communication cannot be verified using the first public key, processor 126 uses (340 and 350) the replacement public key, i.e. the second public key associated with the first public key in the example, to attempt authentication of the signed communication. If successful, verifier device 120 may assume that the first private key has been replaced.

Verifier device 120 also receives (360) a new replacement public key, i.e. a third public key, from user device 110 and updates (370) the authentication database. Verifier device 120 may receive the third public key with the signed verification. However, verifier device 120 may accept the third public key after a successful authentication using the second public key. This prevents wrongful possessors of previous public keys from creating a plausible looking replacement key. Alternatively, verifier device 120 may request a replacement key after a successful authentication using the second public key.

Also, while verifier device 120 may receive and/or accept the third public key, the authentication database may not indicate that the second public key has been replaced. This is because verifier device 120 may update the authentication database periodically or based on certain intervals. As a result, if the second private key becomes inactive and a communication using the third private key is received from user device 110 before the authentication database is updated, verifier device 120 cannot recognize and therefore verify the communication. Accordingly, more than one set of replacement keys associated with a primary key may be created, in advance, and output as future replacement keys.

In FIG. 3, it is assumed that authentication using the second public key is successful. However, the second public key may result in an unsuccessful authentication due to various reasons. One reason may be that a wrongful possessor is trying to replace the primary key. Another reason may be that the second private key has been replaced by the third private key, in which case verifier device 120 may have already received a third public key. Therefore, if the second public key results in an unsuccessful authentication, verifier device 120 may attempt authentication using a new replacement key, i.e. the third public key, if available. Otherwise, the authentication fails. It would be understood that verifier device 120 may attempt authentication using a fourth public key if the third private key is replaced by a fourth private key, a fifth public key if the fourth private key is replaced by a fifth private key, and so on. In some embodiments, the number of times a public key can be replaced may be limited based a given number of allowable replacements or a given period of time.

As described, a third set of keys is created and output as the replacement keys that are inactive while the second set of keys becomes active and is used for subsequent authentications. It is also possible to use the third set of keys for subsequent authentications. For example, user device 110 creates a third set of keys and re-creates the second private key. The second private key is initially used for authentication of a communication. This is because verifier device 120 may not yet recognize that a third set of keys has been created. The third public key may be output with the signed communication. When the communication is successfully verified, verifier device 120 may update the authentication database such that the third set is used for subsequent authentications.

If the authentication database is updated periodically or based on certain intervals, the second private key may temporarily remain active and be used for authentication, even if the third public key has been output. The third private key may then become active after a selected interval based on the update schedule of verifier device 120. Alternatively, when the authentication database is updated, verifier device 120 may send a control signal to user device 110 indicating that the authentication database has been updated. User device 110 would then use the third private key and verifier device 120 would use the third public key for authentication. Still alternatively, verifier device 120 may request a replacement key at a time such that the authentication database may be updated to store the replacement key. Here, user device 110 would not output the third public key until a request is received from verifier device 120.

When user device 110 begins using the third private key for authentication, the second private key may be discarded such that it cannot be re-created if user device 110 is lost or stolen. In addition, note that user device 110 outputs neither the second nor the third private keys since the second private key has already been output. However, user device 110 may be configured to allow an owner of user device to again output the second private key when it is re-created. The second private key may then be output once to one or more of the same or different entities using, for example, a sharing scheme.

Accordingly, the second private key may act as a temporary private key that authenticates the owner of user device 110 and allows replacement of the first private key with a new private key, i.e. the third private key. The third private key is then used for authentication until it becomes inactive, at which time the second private key is again re-created and used for authenticating the owner of user device 110 to allow replacement of the third private key with a new private key. Here, a fourth set of replacement keys would be created to replace the third private key.

In another embodiment, third and fourth sets of keys may be created as replacement keys for the first and second sets of keys. The private key of one set is used for subsequent authentications while the private key of the other set is output once at the request of the owner of user device 110 such that it can be re-created. For example, the third private key may be used for subsequent authentications while the fourth private key is output such that it can be recreated. Here, the second private key may still act as a temporary private key that authenticates the owner of user device 110 and allows replacement of the first private key with a new private key, i.e. the third private key. The second private key may be discarded after the first private key is replaced. The third private key is then used for authentication until it becomes inactive, at which time the fourth private key is re-created and used for authenticating the owner of user device 110 to allow replacement of the third private key with new sets of replacement keys. In this case, a fifth and sixth sets of keys are created as new sets of replacement keys.

Multiple sets of cryptographic keys may be generated independently as described above, where one acts as the primary key for authentication while the another acts as a replacement key, thereby acting as a back-up key, in case the primary key becomes inactive. In another embodiment, a set of replacement keys may be derived from a previous set of cryptographic keys.

Figure 4:
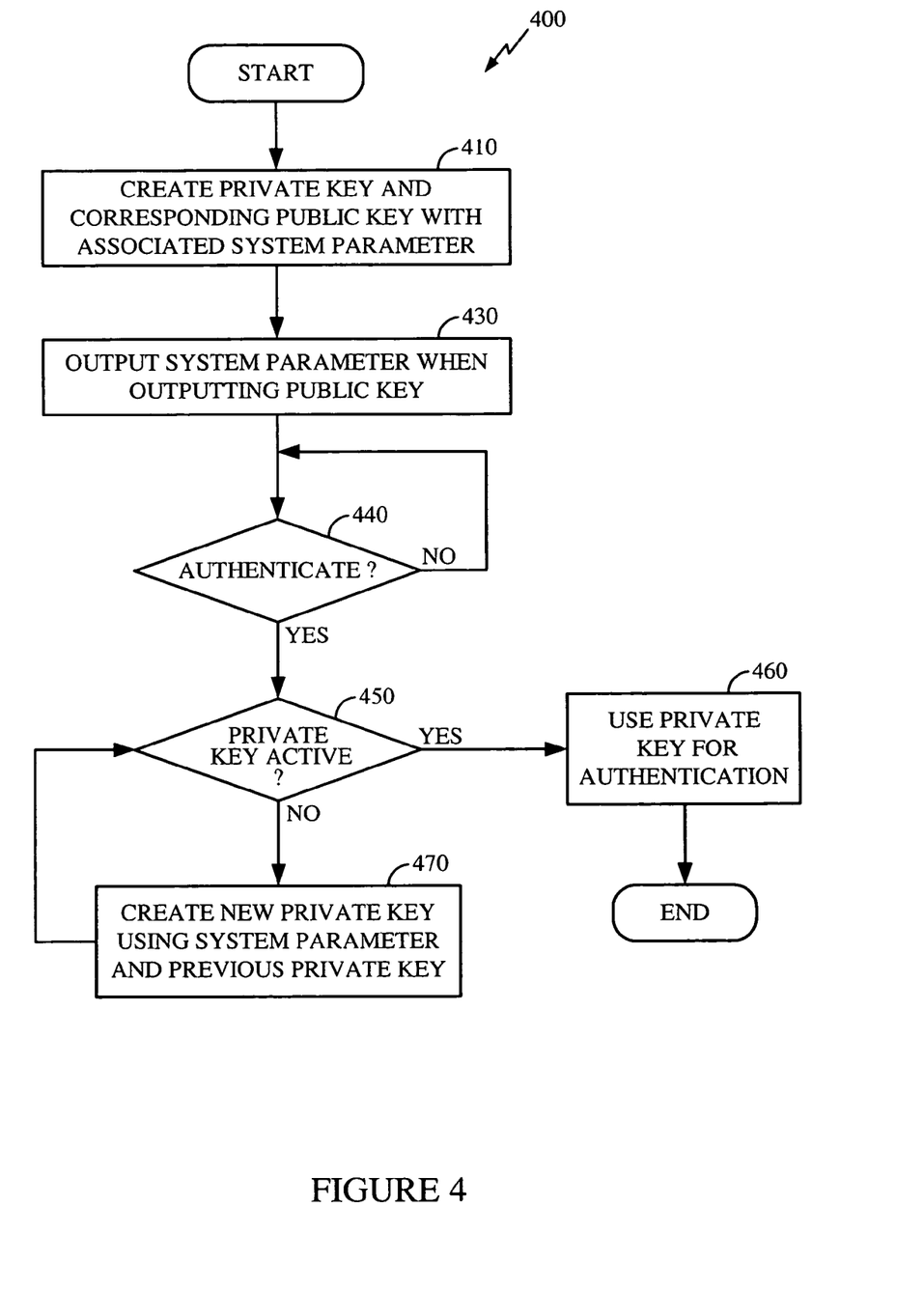
FIG. 4 shows another method for authentication from a user device.

FIG. 4 shows another method 400 for generating keys for public key cryptographic systems. Processor 112 creates (410) a private key and corresponding public key with associated system parameter. The keys and system parameter may initially be stored in storage medium 114. The private key is kept within user device 110 while the public key and system parameters are output (430) using transmitter 116.

When authenticating, the private key is used if it is active (440, 450 and 460). Namely, user device 110 signs a communication with the private key and sends the communication and associated signature to a targeted party or device, who or which then verifies the communication with the corresponding public key. If the private key is not active, a new or replacement private key is created (470) using the system parameter and the old or previous private key. Here, the previous private key may not be active for various reasons. For example, the owner of user device 110 may have inactivated the private key because user device 110 is stolen, broken, lost or destroyed. Alternatively, a private key may expire in some cryptography systems. The new private key is then used for authentication if it is active (450 and 460). The use of a new private key disables the previous private key.

Figure 5:
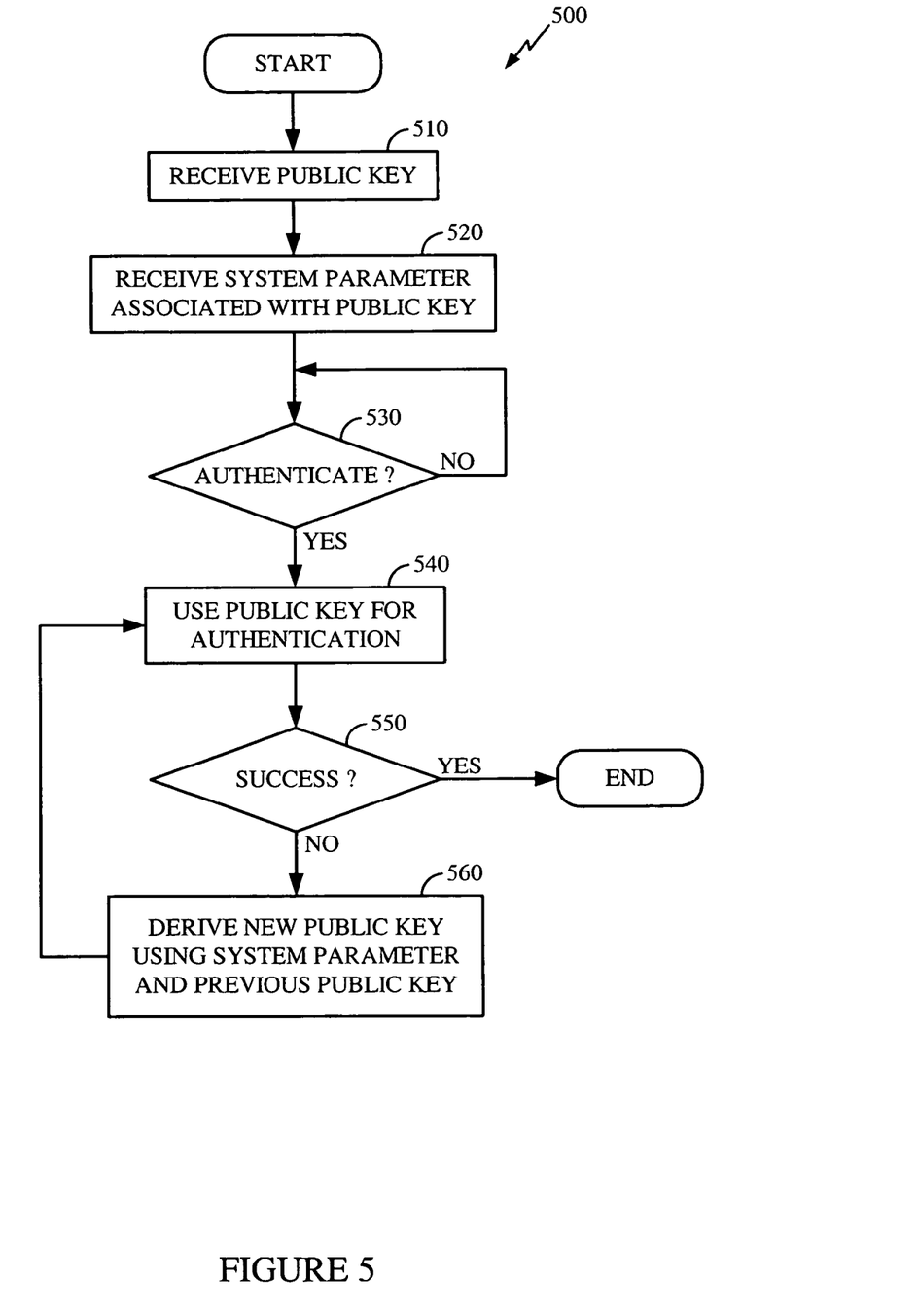
FIG. 5 shows another method for verification from a verifier device.

FIG. 5 shows a method 500 corresponding to method 400 for authenticating communications. Verifier device 120 receives (510) a public key corresponding to a private key from user device I 10. Verifier device 120 also receives (520) a system parameter associated with the private and public key from user device 110. The public key and system parameter are stored in the authentication database of storage medium 124.

When a signed communication is received from user device 110 for authentication, processor 126 authenticates (530 and 540) with the corresponding public key. Namely, the corresponding public key is retrieved from the authentication database and used to verify the communication and associated signature. If the communication cannot be verified using the public key, processor 126 derives (560) a new public key using the previous public key and the system parameter. Verifier device 120 then attempts authentication (540) using the new public key. This derivation and attempts using new or replacement public keys may occur repetitively as described and as needed until a successful authentication occurs. In some embodiments, the number of times a secret key can be replaced may be limited based on a given number of allowable replacements or a given period of time.

In methods 400 and 500, the system parameter depends on the cryptographic system implemented. For example, if the cryptographic system were based on DSS, the system parameter would be a random number.

More particularly, at the time a secret key x is created, the user device creates a random number r that is also a member of the mod Q subgroup and an optional counter c, to be associated with the public and secret keys. When the public key is output and stored in verifier device 120, r and c are also output. Assuming that the original user device 110 has c=0, user device 110 creates shares of a replacement secret key y as follows:

$$y = x * r \pmod{P}$$

The corresponding public key Y is as follows:

$$Y = g^y = g^{(x*r)} = (g^x)^r = X^r \text{ (all } mod\ P).$$

The new public key can be derived from knowledge of the old public key and r.

A newly created user device 110, such as for example a token, provisioned with the new key y, should increment c and retain the same r. Signatures generated by any user device 110 might include c, enabling a verifier device 120 to easily decide which public key to use for verification. Furthermore, a verifier device 120 can accept and verify a signature even if a number of replacements have occurred since the last time the owner authenticated. If c is included in the signature, it is used to exponentiate the old public key an appropriate number of times based upon c. If c is not included, the verifier device 120 can simply try a number of powers of X. Here, a limit to the number of tries may be set. If one of these derived public keys works to verify the signature, it is accepted as the new public key.

Therefore, the owner of user devices can make provision for its future replacement, without revealing the secret key at the time. Also, when the replacement user device and/or secret key is used, it will be implicitly verified. Namely, the act of using the new user device and/or secret key may be used by the verifier to disable the old user device and/or secret key.

It is to be noted that while the embodiments are described in terms of the DSS, the scope is not limited to DSS. The embodiments can apply to other public-key systems, although generally with different mathematics and processes known in the art. Also, some embodiments are described in terms of Shamir's secret sharing method, but other known methods are equally applicable. Moreover, although user device 110 shows one processor 112 configured to generate each private, public, and replacement keys and to use the generated key(s) for authentication, more than one processor may be implemented to generate and/or use the generated key(a) for authentication. Similarly, although verifier device 120 shows one processor 124 configured to generate each public key, as applicable, and to use the generated key(s) for authentication, more than one processor may be implemented to generate and/or use the generated key(a) for authentication. In addition, it would be understood by those skilled in the art that the elements of user device 110 may be re-arranged, as desired, without affecting the operation and function of user device 110. Similarly, the elements of verifier device 120 may be re-arranged, as desired, without affecting the operation and function of verifier device 120.

Furthermore, embodiments may be implemented by hardware, software, firmware, middleware, microcode, or any combination thereof. When implemented in software, firmware, middleware or microcode, program code or code segments to perform the necessary tasks may be stored in a machine readable medium such as storage medium 114 and/or storage medium 124 respectively, or in a separate storage medium(s) not shown. Processor 112 and/or 126 may perform the desired tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

Therefore, the foregoing embodiments are merely examples and are not to be construed as limiting the invention. The description is intended to be illustrative, and not to limit the scope of the claims. As such, the present teachings

What we claim is:

1. A method operational for authentication in a public cryptographic system comprising:
   creating a first private key and corresponding first public key at a mobile user device;
   creating a second private key associated with the first private key and creating a second public key corresponding to the second private key at the mobile user device;
   outputting the second private key from the mobile user device such that it is not stored on the mobile user device while retaining the first private key in the mobile user device, wherein outputting the second private key comprises transmitting a plurality of shares of the second private key from the mobile user device to a plurality of different entities once, such that the second private key can be re-created and used when the first private key is inaccessible;
   transmitting the first public key and the second public key to a verifier device; and
   using the retained first private key for authentication of the mobile user device prior to using the second private key.

2. The method of claim 1, wherein transmitting the plurality of shares of the second private key comprises:
   creating at least two shares of the second private key at the mobile user device; and
   wirelesly outputting each share once to a different entity.

3. The method of claim 1, further comprising:
   re-creating the second private key at one of the mobile user device or a replacement mobile user device using at least some shares of the plurality of shares; and
   using the second private key independent of the first private key for authentication of the mobile user device or the replacement mobile user device.

4. The method of claim 3, further comprising:
   creating a third private key associated with the second private key and creating a third public key corresponding to the third private key; and
   outputting the third public key to the verifier device.

5. The method of claim 4, further comprising:
   outputting the third private key once as a plurality of shares such that it can be re-created;
   re-creating the third private key using at least some of the plurality of shares; and
   using the third private key for authentication.

6. The method of claim 3, further comprising:
   creating a third private key associated with the second private key and creating a third public key corresponding to the third private key;
   creating a fourth private key associated with the third private key and creating a fourth public key corresponding to the fourth private key;
   outputting the fourth private key once such that it can be re-created; and
   outputting the third and fourth public keys.

7. The method of claim 6, further comprising:
   disabling use of the second private key for authentication;
   using the third private key for authentication;
   re-creating the fourth private key; and
   using the fourth private key for authentication.

8. The method of claim 1, wherein the second public and private keys are created independently from the first public and private keys.

9. The method of claim 1, further comprising:
   preventing retransmission of the second private key.

10. The method of claim 1, wherein the second private key is removed from the mobile user device upon transmission of the plurality of shares of the second private key.

11. A method for verification in a public cryptographic system comprising:
   receiving a first public key from a mobile user device, wherein the first public key has a corresponding first private key stored on the mobile user device;
   receiving a second public key from the mobile user device, the second public key associated with the first public key, wherein the second public key has a corresponding second private key that is split into a plurality of shares that are sent to a plurality of different entities such that it is not stored on the mobile user device, where each share is sent only once and to a different entity, such that the second private key can be re-created and used when there is no access to a first private key corresponding to the first public key, wherein the first private key is disabled when the second private key is re-created and used for authentication;
   using the first public key for authentication of the mobile user device; and
   using the second public key for authentication if the first public key fails.

12. The method of claim 11, further comprising:
   receiving a third public key from one of the mobile user device or another mobile user device, the third public key associated with the second public key, if the first public key fails and if the second public key results in a successful authentication.

13. The method of claim 11, further comprising:
   receiving a third public key and a fourth public key if the first public key fails and if the second public key results in a successful authentication, wherein the third and the fourth public keys are associated with the second public key.

14. A mobile user device configured for authentication in a public cryptographic system comprising:
   means for creating a first private key and corresponding first public key at the mobile user device;
   means for storing the first private key at the mobile user device;
   means for creating a second private key associated with the first private key and creating a second public key corresponding to the second private key at the mobile user device;
   means for outputting the second private key from the mobile user device such that it is not stored on the mobile user device while retaining the first private key in the mobile user device, wherein outputting the second private key comprises outputting a plurality of shares of the second private key to a plurality of different entities once such that the second private key can be re-created and used when the first private key is inaccessible, wherein the first private key is disabled when the second private key is re-created and used for authentication;
   means for outputting the first public key and the second public key to a verifier device; and
   means for using the retained first private key for authentication prior to using the second private key.

15. The device of claim 14, wherein means for outputting the second private key comprises:
   means for creating at least two shares of the second private key at the mobile user device; and
   means for outputting each share once to a different entity, wherein subsequent outputting of the second private key is prevented.

16. The device of claim 14, further comprising:
means for re-creating the second private key at one of the mobile user device or another mobile user device using at least some shares of the plurality of shares; and
means for using the second private key for authentication of the one of the mobile user device or the other mobile user device.

17. The device of claim 16, further comprising:
means for creating a third private key associated with the second private key and creating a third public key corresponding to the third private key; and
means for outputting the third public key to the verifier device.

18. The device of claim 16, further comprising:
means for creating a third private key associated with the second private key and for creating a third public key corresponding to the third private key;
means for creating a fourth private key associated with the third private key and for creating a fourth public key corresponding to the fourth private key;
means for outputting the fourth private key once such that it can be re-created; and
means for outputting the third and fourth public keys to the verifier device.

19. The device of claim 14, wherein the means for outputting the plurality of shares of the second private key comprise means for removing the second private key from the mobile user device.

20. A verifier apparatus configured for verification in a public cryptographic system comprising:
means for receiving a first public key from a mobile user device, wherein the first public key has a corresponding first private key stored on the mobile user device;
means for receiving a second public key from the mobile user device, the second public key associated with the first public key, wherein the second public key has a corresponding second private key that is split into a plurality of shares that are sent to a plurality of different entities such that it is not stored on the mobile user device, where each share is sent only once and to a different entity, such that the second private key can be re-created and used when there is no access to a first private key corresponding to the first public key, wherein the first private key is disabled when the second private key is re-created and used for authentication;
means for storing the first public key and the second public key;
means for using the first public key for authentication of the mobile user device; and
means for using the second public key for authentication if the first public key fails.

21. The apparatus of claim 20, further comprising:
means for receiving a third public key associated with the second public key from one of the mobile user device or another mobile user device, if the first public key fails and if the second public key results in a successful authentication of the mobile user device or the other mobile user device.

22. The apparatus of claim 20, further comprising:
means for receiving a third public key and a fourth public key, if the first public key fails and if the second public key results in a successful authentication, wherein the third and fourth public keys are associated with the second public key.

23. A non-transitory machine-readable medium comprising instructions for performing a public cryptography, which when executed by a processor causes the processor to:
create a first private key and corresponding first public key;
create a second private key associated with the first private key and create a second public key corresponding to the second private key;
retain the first private key and output the second private key such that it is not stored on a device where the second private key was created, the second private key being output as a plurality of shares to a plurality of different entities once such that the second private key can be re-created and used when there is no access to the first private key, wherein the first private key is disabled when the second private key is re-created and used for authentication;
output the first public key and the second public key to a verifier device; and
use the retained first private key for authentication prior to using the second private key for authentication.

24. The machine-readable medium of claim 23, wherein outputting the second private key further comprises instructions to:
create at least two shares of the second private key; and
output each share once to a different entity.

25. The machine-readable medium of claim 23 further comprising instructions to:
recreate the second private key; and
use the second private key for authentication.

26. The machine-readable medium of claim 23, wherein the processor is further caused to remove the second private key from the mobile device upon outputting the plurality of shares of the second private key to the plurality of different entities.

27. A non-transitory machine-readable medium comprising instructions for performing a public cryptography at a verifier device, which when executed by a processor causes the processor to:
receive a first public key from a mobile user device, wherein the first public key has a corresponding first private key stored on the mobile user device;
receive a second public key from the mobile user device, the second public key associated with the first public key, wherein the second public key has a corresponding second private key that is split into a plurality of shares that are sent to a plurality of different entities such that it is not stored on a device where the second private key was created, where each share is sent only once and to a different entity, such that the second private key can be re-created and used when there is no access to a first private key corresponding to the first public key, wherein the first private key is disabled when the second private key is re-created and used for authentication;
use the first public key for authentication of the mobile user device; and
use the second public key for authentication if the first public key fails.

28. The machine-readable medium of claim 27 further comprising instructions to:
receive a third public key associated with the second public key, if the first public key fails and if the second public key results in a successful authentication.

29. The machine-readable medium of claim 27 further comprising instructions to:
- receive a third public key and a fourth public key associated with the second public key, if the first public key fails and if the second public key results in a successful authentication.

30. A mobile user device used for authentication comprising:
- a processor configured to:
- generate a first private key and corresponding first public key;
- generate a second private key associated with the first private key; and
- create a second public key corresponding to the second private key;
- a storage medium coupled to the processor, the storage medium configured to store the first private key; and
- a transmitter coupled to the processor to:
- output the second private key such that it is not stored in the storage medium, the second private key being output as a plurality of shares to a plurality of different entities once, such that the second private key can be re-created and used when there is no access to the first private key, wherein the first private key is disabled when the second private key is re-created and used for authentication; and
- output the first public key and the second public key to a verifier device;
- wherein the processor uses the stored first private key for authentication of the mobile user device prior to using the second private key.

31. The mobile user device of claim 30, wherein the processor is configured to remove the second private key upon the output of the plurality of shares of the second private key to the plurality of different entities.

32. Apparatus used for verification comprising:
- a receiver configured to receive a first public key from a mobile user device and to receive a second public key from the mobile user device, wherein the first public key has a corresponding first private key stored on the mobile user device and the second public key associated with the first public key, wherein the second public key has a corresponding second private key that is split into a plurality of shares that are sent to a plurality of different entities such that the second private key is not stored on a device where it was created, where each share is sent only once and to a different entity, such that the second private key can be re-created and used when there is no access to a first private key corresponding to the first public key, wherein the first private key is disabled when the second private key is re-created and used for authentication;
- a storage medium coupled to the receiver, configured to store the first and second public keys; and
- a processor coupled to the receiver and the storage medium, the processor configured to use the first public key for authentication of the mobile user device, the processor configured to use the second public key for authentication if the first public key fails.

33. A method operational for authentication in a public cryptographic system, comprising:
- re-creating a second private key at a mobile user device that has no access to a first private key associated with the second private key, wherein the second private key is re-created using at least some shares of a plurality of shares of the second private key located at a plurality of different entities;
- creating a third private key and a corresponding third public key;
- outputting the third private key from the mobile user device such that it is not stored on the mobile user device while retaining the second private key at the mobile user device; and
- using the second private key for authentication of the mobile user device before using the third private key.

34. The method of claim 33, wherein re-creating the second private key at a mobile user device that has no access to the first private key includes re-creating the second private key at a mobile user device different from a mobile user device that created the first private key and the second private key.

35. The method of claim 33, wherein outputting the third private key comprises transmitting a plurality of shares of the third private key from the mobile user device to a plurality of different entities once, such that the third private key can be re-created to replace use of the second private key; and
- further comprising transmitting the third public key to a verifier device.

36. The method of claim 33, further comprising:
- creating a fourth private and a corresponding fourth public key;
- outputting the fourth private key from the mobile user device while retaining the third private key in the mobile user device, wherein outputting the fourth private key comprises transmitting a plurality of shares of the fourth private key from the mobile user device to a plurality of different entities once, such that the fourth private key can be re-created to replace use of the third private key; and
- transmitting the third public key and the fourth public key to a verifier device.

37. A mobile user device adapted for authentication in a public cryptographic system, comprising:
- means for re-creating a second private key at a mobile user device that has no access to a first private key associated with the second private key, wherein the second private key is re-created using at least some shares of a plurality of shares of the second private key located at a plurality of different entities;
- means for creating a third private key and a corresponding third public key;
- means for outputting the third private key from the mobile user device such that it is not stored on the mobile user device while retaining the second private key at the mobile user device; and
- means for using the second private key for authentication of the mobile user device before using the third private key.

38. The mobile user device of claim 37, wherein the means for re-creating a second private key at a mobile user device that has no access to a first private key includes means located at a mobile user device different from a mobile user device that created the first private key and the second private key.

39. The mobile user device of claim 37, wherein outputting the third private key comprises transmitting a plurality of shares of the third private key from the mobile user device to a plurality of different entities once, such that the third private key can be re-created to replace use of the second private key; and
- further comprising means for transmitting the third public key to a verifier device.

40. The mobile device of claim 37, further comprising:
- means for creating a fourth private and a corresponding fourth public key;

means for outputting the fourth private key from the mobile user device while retaining the third private key in the mobile user device, wherein outputting the fourth private key comprises transmitting a plurality of shares of the fourth private key from the mobile user device to a plurality of different entities once, such that the fourth private key can be re-created to replace use of the third private key; and means for transmitting the third public key and the fourth public key to a verifier device.

41. A non-transitory machine-readable medium comprising instructions for performing a public cryptography, which when executed by a processor causes the processor to:

re-create a second private key at a mobile user device that has no access to a first private key associated with the second private key, wherein the second private key is re-created using at least some shares of a plurality of shares of the second private key located at a plurality of different entities;

create a third private key and a corresponding third public key;

output the third private key from the mobile user device such that it is not stored on the mobile user device while retaining the second private key at the mobile user device; and use the second private key for authentication of the mobile user device before using the third private key.

42. The machine-readable medium of claim 41, wherein the mobile user device at which the second private key is re-created is a different device from a mobile user device that created the first private key and the second private key.

43. The machine-readable medium of claim 41, wherein outputting the third private key comprises transmitting a plurality of shares of the third private key from the mobile user device to a plurality of different entities once, such that the third private key can be re-created to replace use of the second private key; and further comprising instructions to transmit the third public key to a verifier device.

44. The machine-readable medium of claim 41, further comprising instructions to:

create a fourth private and a corresponding fourth public key;

output the fourth private key from the mobile user device while retaining the third private key in the mobile user device, wherein outputting the fourth private key comprises transmitting a plurality of shares of the fourth private key from the mobile user device to a plurality of different entities once, such that the fourth private key can be re-created to replace use of the third private key; and transmit the third public key and the fourth public key to a verifier device.

* * * * *